(12) United States Patent
Ozzie et al.

(10) Patent No.: US 8,954,507 B2
(45) Date of Patent: Feb. 10, 2015

(54) GATHERING AND USING AWARENESS INFORMATION

(75) Inventors: Raymond E. Ozzie, Seattle, WA (US); George P. Moromisato, Seattle, WA (US); Abhay V Parasnis, Sammamish, WA (US); Noah B Edelstein, Medina, WA (US); William D. Devlin, Sammamish, WA (US); Anthony D Andrews, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1091 days.

(21) Appl. No.: 11/766,963

(22) Filed: Jun. 22, 2007

(65) Prior Publication Data

US 2008/0320025 A1  Dec. 25, 2008

(51) Int. Cl.
  *G06F 15/16*  (2006.01)
  *G06F 15/173*  (2006.01)
  *G06Q 10/10*  (2012.01)
  *H04L 29/08*  (2006.01)
  *H04L 12/58*  (2006.01)

(52) U.S. Cl.
  CPC .......... *G06Q 10/10* (2013.01); *H04L 29/08684* (2013.01); *G06Q 10/103* (2013.01); *H04L 29/08675* (2013.01); *H04L 12/582* (2013.01); *H04L 12/5815* (2013.01)
  USPC ............ 709/205; 709/204; 709/207; 709/224

(58) Field of Classification Search
  CPC ... G06Q 10/10; G06Q 10/109; G06Q 10/103; H04L 12/581; H04L 12/5815; H04L 12/582; H04L 51/04; H04L 67/24; H04L 29/08675; H04L 29/08684

USPC ................ 709/203, 229, 204–207, 223–224; 707/9

See application file for complete search history.

(56) References Cited

U.S. PATENT DOCUMENTS

| 5,613,079 | A | 3/1997 | Debique et al. |
| 5,724,556 | A | 3/1998 | Souder et al. |

(Continued)

FOREIGN PATENT DOCUMENTS

| JP | 09-44334 A | 2/1997 |
| JP | 2001-101190 A | 4/2001 |

(Continued)

OTHER PUBLICATIONS

U.S. Appl. No. 10/656,904.

(Continued)

*Primary Examiner* — Tae Kim
(74) *Attorney, Agent, or Firm* — Bryan Webster; Kate Drakos; Micky Minhas

(57) ABSTRACT

Systems, methods, and user interfaces for gathering and using awareness information with common awareness functionality accessible to multiple applications are disclosed. Such systems, methods, and user interfaces may aggregate awareness information from multiple sources and provide awareness data and other derived information to multiple destinations. In some implementations, such systems and methods may provide additional functionality related to awareness information, such as common user interfaces that display awareness information or mechanisms for determining the relevance of particular pieces of awareness information.

20 Claims, 8 Drawing Sheets

(56) References Cited

U.S. PATENT DOCUMENTS

| | | | |
|---|---|---|---|
| 5,978,567 A | 11/1999 | Rebane | |
| 5,987,506 A | 11/1999 | Carter et al. | |
| 6,028,602 A | 2/2000 | Weidenfeller | |
| 6,029,171 A * | 2/2000 | Smiga et al. | 1/1 |
| 6,446,077 B2 | 9/2002 | Straube et al. | |
| 6,622,147 B1 * | 9/2003 | Smiga et al. | 707/771 |
| 6,728,713 B1 | 4/2004 | Beach et al. | |
| 6,760,721 B1 | 7/2004 | Chasen | |
| 6,760,828 B1 | 7/2004 | Black | |
| 6,922,757 B2 | 7/2005 | Frank et al. | |
| 6,954,543 B2 | 10/2005 | Svendsen | |
| 6,954,934 B2 | 10/2005 | Kumar | |
| 7,007,041 B2 | 2/2006 | Multer et al. | |
| 7,117,505 B2 | 10/2006 | Lanzatella et al. | |
| 7,191,217 B2 * | 3/2007 | Tanabe et al. | 709/205 |
| 7,207,008 B1 | 4/2007 | Koch et al. | |
| 7,305,437 B2 * | 12/2007 | Horvitz et al. | 709/204 |
| 7,409,423 B2 * | 8/2008 | Horvitz et al. | 709/206 |
| 7,412,534 B2 | 8/2008 | Tsang et al. | |
| 7,660,416 B1 * | 2/2010 | Kline | 380/216 |
| 7,904,323 B2 * | 3/2011 | Wynn et al. | 715/751 |
| 8,533,268 B1 * | 9/2013 | Vernon et al. | 709/205 |
| 2001/0013072 A1 * | 8/2001 | Okada et al. | 709/315 |
| 2002/0133508 A1 | 9/2002 | LaRue | |
| 2003/0009602 A1 | 1/2003 | Jacobs et al. | |
| 2003/0142139 A1 | 7/2003 | Brown | |
| 2003/0167279 A1 * | 9/2003 | Smiga et al. | 707/102 |
| 2003/0195932 A1 * | 10/2003 | Tanabe et al. | 709/205 |
| 2003/0217098 A1 * | 11/2003 | Bobde et al. | 709/202 |
| 2003/0220966 A1 | 11/2003 | Hepper et al. | |
| 2004/0103167 A1 | 5/2004 | Grooters et al. | |
| 2004/0172423 A1 * | 9/2004 | Kaasten et al. | 707/201 |
| 2004/0189694 A1 | 9/2004 | Kurtz | |
| 2004/0252185 A1 * | 12/2004 | Vernon et al. | 348/14.08 |
| 2004/0268262 A1 | 12/2004 | Gupta | |
| 2005/0039139 A1 | 2/2005 | Schwartz | |
| 2005/0086384 A1 | 4/2005 | Ernst | |
| 2005/0114790 A1 | 5/2005 | Dunbar | |
| 2005/0198299 A1 * | 9/2005 | Beck et al. | 709/226 |
| 2005/0203935 A1 | 9/2005 | McArdle | |
| 2006/0036568 A1 | 2/2006 | Moore | |
| 2006/0047584 A1 | 3/2006 | Vaschilllo | |
| 2006/0048073 A1 | 3/2006 | Jarrett | |
| 2006/0112076 A1 * | 5/2006 | Burris et al. | 707/3 |
| 2006/0129917 A1 | 6/2006 | Volk et al. | |
| 2006/0136441 A1 | 6/2006 | Fujisaki | |
| 2006/0161516 A1 | 7/2006 | Clarke | |
| 2006/0168154 A1 | 7/2006 | Zhang et al. | |
| 2006/0218492 A1 | 9/2006 | Andrade | |
| 2006/0242581 A1 * | 10/2006 | Manion et al. | 715/733 |
| 2006/0247961 A1 | 11/2006 | Klemow | |
| 2006/0265647 A1 | 11/2006 | Nicholas | |
| 2006/0288034 A1 | 12/2006 | Do | |
| 2006/0294474 A1 | 12/2006 | Taylor | |
| 2007/0005707 A1 | 1/2007 | Teodosiu | |
| 2007/0033531 A1 * | 2/2007 | Marsh | 715/738 |
| 2007/0124458 A1 | 5/2007 | Kumar | |
| 2007/0226183 A1 * | 9/2007 | Hart et al. | 707/3 |
| 2008/0126480 A1 * | 5/2008 | Hintermeister et al. | 709/204 |
| 2008/0139116 A1 | 6/2008 | Balgard | |
| 2008/0155112 A1 | 6/2008 | Ma | |
| 2008/0201338 A1 | 8/2008 | Castro | |
| 2008/0256213 A1 | 10/2008 | Carrier et al. | |
| 2008/0276195 A1 | 11/2008 | Moromisato et al. | |
| 2008/0317068 A1 | 12/2008 | Sagar | |
| 2009/0077262 A1 | 3/2009 | Roberts | |
| 2009/0100151 A1 | 4/2009 | Fisher | |
| 2009/0112870 A1 | 4/2009 | Ozzie | |
| 2009/0138808 A1 * | 5/2009 | Moromisato et al. | 715/758 |
| 2011/0125804 A1 | 5/2011 | Aegerter | |
| 2011/0197287 A1 | 8/2011 | Hess | |
| 2012/0179683 A1 | 7/2012 | Balassanian | |

FOREIGN PATENT DOCUMENTS

| | | |
|---|---|---|
| JP | 2001-292425 A | 10/2001 |
| JP | 2005-72826 A | 3/2005 |
| WO | 2005/099176 A1 | 10/2005 |

OTHER PUBLICATIONS

Reiss, Spencer, "Here Comes Trouble", Wired Magazine, Date: Feb. 2007, http://www.wired.com/wired/archive/15.02/trouble_pr.html.

Response to Non-Final Rejection, U.S. Appl. No. 11/931,726, dated Jun. 10, 2011, 12 pages.

Response to Non-Final Rejection, U.S. Appl. No. 11/744,782, dated Jul. 14, 2011, 14 pages.

Non-Final Rejection, U.S. Appl. No. 11/744,782, dated Apr. 14, 2011, 18 pages.

Amendment Submitted with RCE, U.S. Appl. No. 11/744,782, dated Jul. 26, 2010, 13 pages.

Final Rejection, U.S. Appl. No. 11/744,782, dated Apr. 27, 2010, 18 pages.

Response to Non-Final Rejection, U.S. Appl. No. 11/744,782, dated Dec. 23, 2009, 13 pages.

Non-Final Rejection, U.S. Appl. No. 11/744,782, dated Oct. 5, 2009, 11 pages.

Preliminary Amendment, U.S. Appl. No. 11/744,782, dated Oct. 3, 2007, 7 pages.

Chinese Office Action, Application No. 200880014416.01, dated Apr. 25, 2011, 8 pages.

International Search Report, PCT/US2008/062240 mailed Sep. 26, 2008, 11 pages.

Ivan Voras et al., "A Hierarchical File System Interface to Database-based Content Management Application", ITI 2006, 6 pages.

Greg Stein, "WebDAV and Apache", ApacheCon US 2002, 10 pages.

Simon Scerri, "semantExplorer: a Semantic Web Browser", 2005, 3 pages.

Non-Final Rejection, U.S. Appl. No. 11/931,726, dated Dec. 30, 2009, 13 pages.

Response to Non-Final Rejection, U.S. Appl. No. 11/931,726, dated Mar. 15, 2010, 13 pages.

Final Rejection, U.S. Appl. No. 11/931,726, dated May 25, 2010, 13 pages.

Response to Final Rejection, U.S. Appl. No. 11/931,726, dated Jul. 9, 2010, 12 pages.

Non-Final Rejection, U.S. Appl. No. 11/931,726, dated Mar. 15, 2011, 14 pages.

U.S. Appl. No. 11/931,726, Non-Final Office Action mailed Sep. 6, 2011, 16 pages.

U.S. Appl. No. 11/931,726, Response to Non-Final Office Action filed Dec. 15, 2011, 10 pages.

U.S. Appl. No. 11/744,782, Final Office Action mailed Oct. 31, 2011, 18 pages.

Chinese Application No. 200880014416.01, Response to Office Action, dated Sep. 2, 2011, 14 pages (including translation of marked-up amended claims).

U.S. Appl. No. 11/931,726, Final Office Action mailed Feb. 9, 2012, 10 pages.

U.S. Appl. No. 11/931,726, Amendment After Final Office Action dated Jun. 8, 2012, 12 pages.

U.S. Appl. No. 11/744,782, Amendment After Final Office Action, dated Jan. 31, 2012, 12 pages.

U.S. Appl. No. 11/744,782, Office Action mailed Apr. 25, 2012, 20 pages.

U.S. Appl. No. 11/744,782, Amendment, dated Jul. 20, 2012, 16 pages.

Grimshaw, et al., "Architectural Support for Extensibility and Autonomy in Wide-Area Distributed Object Systems", Jun. 3, 1998, pp. 1-57, Technical Report CS-98-12, http://www.cs.virginia.edu/~legion/papers/andrew/CS-98-12.pdf.

Carter, et al., "Khazana An Infrastructure for Building Distributed Services", May 1998, pp. 1-10, Published in the Proceedings of ICDCS'98, http://citeseer.ist.psu.edu/cache/papers/cs/2385/ht-

(56) References Cited

OTHER PUBLICATIONS tp:zSzzSztravesty.cs.utah.eduzSzprojectszSzkhazanazSzpaperszSzicdcs98.pdf/carter98khazana.pdf.

Kistijantoro, et al., "Component Replication in Distributed Systems: a Case study using Enterprise Java Beans", 2001, pp. 1-10, http://citeseer.ist.psu.edu/cache/papers/cs/31299/http:zSzzSzwww.cs.ncl.ac.ukzSzresearchzSzpubszSzauthorszSz..zSzinproceedingszSzpaperszSz687.pdf/kistijantoro03component.pdf.

U.S. Appl. No. 11/931,726, Final Office Action dated Jul. 11, 2014, 16 pages.

U.S. Appl. No. 14/176,057, Office Action dated Aug. 27, 2014, 11 pages.

U.S. Appl. No. 11/744,782, Final Office Action dated Aug. 16, 2012, 22 pages.

U.S. Appl. No. 11/744,782, Amendment dated Nov. 3, 2012, 11 pages.

U.S. Appl. No. 11/744,782, Office Action dated Jun. 12, 2013, 11 pages.

U.S. Appl. No. 11/744,782, Amendment dated Sep. 10, 2013, 12 pages.

Second Chinese Office Action cited in Chinese Application No. 200880014416.1 dated Apr. 19, 2012, 6 pgs.

Reply to Second Chinese Office Action cited in Chinese Application No. 200880014416.1 dated Jun. 19, 2012, 10 pgs.

Notice of Allowance cited in Chinese Application No. 200880014416.1 dated Dec. 5, 2012, 4 pgs.

EP Search Report cited in EP Application No. 08747364.1 dated Aug. 28, 2012, 9 pgs.

EP Communication cited in EP Application No. 08747364.1 dated Sep. 14, 2012, 1 pg.

"iLike-Music Social Networking Like Never Before", MakeUseOf.com, Nov. 11, 2006, reprinted from the Internet at: http://www.makeuseof.comltag/ilike-music-social-networking-like-never-before/, 2 pgs.

"Snoop DOS", Sep. 1994, reprinted from the Internet at: http://cd.textfiles.com/zoom1/utilities/monitors/snoopdos/snootdos.guide, 105 pgs.

"Eclipse", Nov. 25, 2006, reprinted from the Internet at: http://we.archive.org/web/20061125124659/http://www.horstmann.com/bigj/help/eclipse, 11 pgs.

"Veeam Monitor for VMware", Products for VMware, Nov. 13, 2006 reprinted from the Internet at: http://www.veeam.com/news/veeam-software-an nou nces-the-release-of-veeam-mon itor -for- vmware-1 . 5-x64-ed ition. html, 2 pgs.

U.S. Appl. No. 11/931,726, Office Action dated Oct. 3, 2013, 14 pages.

U.S. Appl. No. 11/931,726, Amendment dated Feb. 3, 2014, 14 pages.

U.S. Appl. No. 11/744,782, Notice of Allowance dated Oct. 21, 2013, 9 pages.

* cited by examiner

GATHERING AND USING AWARENESS INFORMATION

BACKGROUND

In one or more computing devices in a group of computing devices, it may be useful to have or provide the capability of being aware of a wide variety of events, actions, and the like. For example, a user may communicate with other people using an instant messaging application. Such an application may indicate when the user's "friends" or contacts are, say, online, offline, in a telephone call, in a meeting, and so on. In so doing, the instant messaging application may enable the user to be aware of the availability or status of the user's friends or contacts. In another example, a collaboration application might manage (and perhaps synchronize) files or documents that are part of a "workspace" or group. Such a collaboration application might also provide information to a user about the actions of other users in the workspace or group, such as when some other user opens a particular document or file, when another user views or modifies information about the workspace itself, and so on.

While at least some applications may exist that manage awareness information, such as information about activities and events, it may be the case that such information is maintained or managed by a single or particular application. For example, a user's availability status may be maintained and accessible using an instant messaging application (perhaps in tandem or also through the use of a variety of, for example, instant messaging or communications servers); information about a task a user is performing may be managed by a collaboration application; and so on. Because different applications may manage particular types or pieces of awareness information, it may be difficult to aggregate or provide a general or holistic view of, for example, a particular user's actions across different applications, events associated with a particular computing device or application, and so on. Furthermore, each application that accesses awareness data may be required to individually implement functionality to gather, manage, and use such awareness information.

SUMMARY

The following presents a simplified summary of the disclosure in order to provide a basic understanding to the reader. This summary is not an extensive overview of the disclosure and does not identify key or critical elements of the invention or delineate the scope of the invention. Its sole purpose is to present some concepts disclosed herein in a simplified form as a prelude to the more detailed description that is presented later.

Described herein are various techniques and technologies directed toward gathering and using awareness information with common or general awareness functionality accessible to multiple applications. When a common awareness system or module is available, multiple applications may, for example, provide awareness data to the common awareness system. Such awareness data, including awareness data aggregated from multiple applications, may then be managed by the common awareness system and perhaps communicated by the common awareness system to other applications on the same computing device and also possibly communicated to other computing devices. The same or another application, on the same or another computing device, may retrieve or use awareness information provided and managed by the common awareness system, and so may not need to implement extensive functionality relating to managing and using awareness information itself. At least some exemplary awareness systems may also provide additional functionality related to awareness data, such as common user interfaces that display awareness information or mechanisms for determining the relevance of particular pieces of awareness data to particular users or computing devices.

DETAILED DESCRIPTION

Described herein are various techniques and technologies directed toward gathering and using awareness information with common or general awareness functionality accessible to multiple applications. More particularly, in at least some implementations when a common awareness system or module is available, multiple applications may, for example, provide awareness data to the common awareness system. Such awareness data, including awareness data aggregated from multiple applications, may then be managed by the common awareness system and perhaps communicated by the common awareness system to other applications on the same computing device and also possibly communicated to other computing devices. The same or another application, on the same or another computing device, may retrieve or use awareness information provided and managed by the common awareness system, and so may not need to implement extensive functionality relating to managing and using awareness information itself. At least some exemplary awareness systems may also provide additional functionality related to awareness data, such as common user interfaces that display awareness information or mechanisms for determining the relevance of particular pieces of awareness data to particular users or computing devices.

Figure 1:
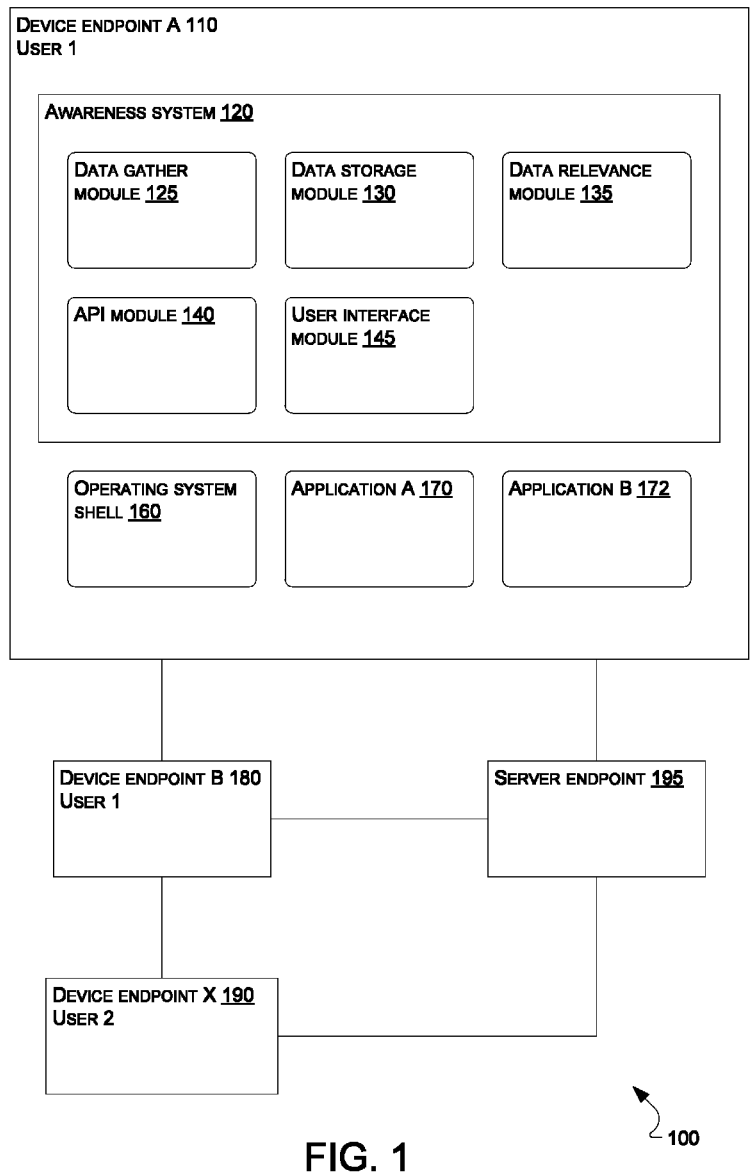
FIG. 1 illustrates an exemplary system in which awareness data may be gathered and used.

Turning now to FIG. 1, shown therein is an exemplary system 100 in which awareness data may be gathered and used. The exemplary system 100 contains a device endpoint A 110, a device endpoint B 180, a device endpoint X 190, and a server endpoint 195. The exemplary device endpoint A is shown as containing an awareness system 120 which in turn is associated with a data gather module 125, a data storage module 130, a data relevance module 135, an API module 140, and a user interface module 145. The exemplary device endpoint A is also shown as including an operating system shell 160, an application A 170, and an application B 172. This description of FIG. 1 may be made with reference to other figures. However, it should be understood that the elements described with reference to FIG. 1 are not intended to be limited to being used with the elements described with reference to other figures. In addition, while the exemplary diagram in FIG. 1 indicates particular elements, in some implementations not all of these elements may exist, and in some implementations additional elements may exist.

Generally, an awareness system, such as the exemplary awareness system 120, may include modules or components that implement, at least in part, functionality associated with the management and use of awareness data. In at least some implementations, such an awareness system may provide functionality to multiple entities, such as multiple applications or processes, that may run or execute on an exemplary computing device, including the exemplary computing device that implements an endpoint such as the device endpoint A 110, or some other endpoint. For example, applications like the application A 170 and the application B 172 may originate, generate, or otherwise provide awareness data that may be managed or maintained by the awareness system. Such awareness data may then be used by, for example, the operating system shell 160 or another application.

Generally, awareness data may be understood to include any data or information that may be used as part of being aware of or having or obtaining knowledge of particular actions or events. Such data may include, for example, information about changes to the state of a particular application, user, device, or piece of data (such as a file or document). Awareness data might also or instead generally include information about the state of an application, user, device, or piece of data. For example, in some implementations, at least some awareness data may include information about the status or availability of a user, such as whether the user is online, offline, in a telephone call, in a meeting, performing some other action, and so on. In the same or other implementations, awareness data might include information about the status of a device, such as whether the device is connected to a network, is not connected to a network or available, currently has spare processing power available, or other information associated with the state of the device. In the same or yet another exemplary implementation, awareness data may include information about whether a particular application or process is in use, is not in use, is up to date or has an available update that has not yet been applied, and so on. In the same or yet another exemplary implementation, awareness data may include information about a particular piece of data, such as information about a file, a document, particular records in a database, and so on. For example, awareness data might include information about whether a particular file is currently being viewed or edited. Further, in some of such cases, or in other cases, awareness data might include additional information such as the part or parts of the document that are being viewed or edited, the user or users that are viewing or editing the document, the specific actions each user is performing with respect to the document, the computing device or endpoint on which each user is viewing or editing the document, and so on.

While in some cases awareness data may include just information associated with one type of entity, such as information associated with a user when the awareness data comprises the user's availability status, in other cases awareness data may include a collection of information associated with multiple entities including one or more users, one or more applications, one or more devices, one or more pieces of data (such as documents or files), and so on. One example of an implementation where awareness data comprises a collection of information might include, for example, the previously introduced awareness data that might be associated with a document, where the awareness data might include information about the document itself as well as information including users that are viewing or editing the document, the endpoints on which users are viewing or editing the document, the application users are using to view or edit the document, and so on.

Awareness data may also include other information, such as, for example, a timestamp associated with a particular action, event, state change, or the like. For example, such other information might include the time at which a document was opened, the time at which a document was first modified, the time at which a document was modified again, the time at which a user became available, and so on.

At least some implementations of an awareness system 120 may include a data gather module 125. An exemplary data gather module may provide functionality associated with tracking, gathering, or obtaining awareness data. (The data gather module may then store such gathered awareness data, in at least some implementations, using the data storage module 130.) Some data gather modules may obtain awareness data in one or more different ways, including by observing changes, by being provided with changes, or by using common data structures that might also be used by other applications. In some implementations of the operational flow 200, described below with reference to FIG. 2, an exemplary data gather module may implement at least part of, for example, the operation 210.

In some implementations, at least some awareness data may be gathered through one or more types of observation, including through observation of entities—such as applications—that may not have knowledge that they are being observed. For example, in some cases a computer operating system may provide notifications to an executable process—one that, perhaps, has registered with the operating system to receive notifications—when a particular file is opened, closed, modified, and so on. With such an operating system, and also in at least some other implementations, a data gather module may register to be notified when one or more events related to particular files or directories occur. In at least some cases, that such notifications are being provided to a registered process may not be known to, for example, the application that performed the action associated with the file or document. A variety of the same or other mechanisms for observing actions or events that occur on a device may be used by an exemplary data gather module to gather awareness data.

In addition to observing actions, a data gather module 125 may also provide the capability for other executable processes, applications, and the like, to pro-actively provide awareness data to the data gather module. In one example of such an implementation, a data gather module might provide one or more application programming interfaces (APIs) that other processes, applications, and the like may use—by calling functions, and so on—to provide awareness or other data to an awareness system 120 or to a data gather module. In some implementations, such an API might be provided by or associated with an exemplary API module including the API module 140. In some implementations, an application or the operating system might use such an API to provide information to a data gather module that may be maintained internally by the application or operating system and that might otherwise be inaccessible to the data gather module. For example, a word processing application might call such an API and provide awareness data such as, for example, "user 1 is viewing paragraph 14" or "user 2 modified paragraph 27 to include the text 'ABC'," and so on. In some cases, such an API may enable an application that is written to use the API the capability of providing more detailed or granular awareness data than a data gather module might otherwise be able to obtain through other methods, such as by observing the application.

In the same or yet other implementations, a data gather module 125 might obtain awareness data by using or accessing data that is also used by an application or the operating system. For example, in an implementation where an application might store application data using one or more files, objects, or other data structures, and the data structures are accessible to a data gather module, the data gather module might obtain at least some awareness data by accessing the same files, objects, or data structures used by the application. For example, when an application makes a change to a file or object to store new information, a data gather module may obtain awareness data from the file or object about the change, and might also obtain awareness data perhaps about the application, about the user that made the application, and so on.

An exemplary data storage module 130 may store and provide access to awareness data using a wide variety of possible means for storing data, including one or more databases, files in a file system, and so on. In some implementations, the data storage module may use storage means that are local to the computing device on which the data storage module is implemented—such as a local database—while in the same or other cases the data storage module may use storage means that include one or more remote storage locations. Such remote storage locations might include, for example, one or more "servers in the cloud" or computing devices or endpoints that provide storage functionality to other computing devices located or accessible, for example, using one more computing networks of a variety of types. In some implementations, an exemplary server endpoint 195 might provide at least some functionality of this type, in addition to possibly providing other functionality. In some implementations, a data storage module might also store data on other endpoints, including endpoints such as the exemplary device endpoint B 180 or the device endpoint X 190. Such endpoints might, for example, be connected and exchange data using one or more mechanisms, including peer-to-peer data communication mechanisms or one or more centralized server endpoints.

In at least some implementations, a data relevance module such as the exemplary data relevance module 135 may determine the relevance of or level of interest in awareness data obtained, for example, by the data gather module 125. In at least some implementations, including those where the data gather module obtains a relatively large amount of awareness data, not all of the data may be equally relevant or "interesting," for example, to a particular user or other entity. Furthermore, if a user or other entity is made aware of every action or event, the awareness data that is truly more interesting may in some cases not be noticed or not be given the attention it might deserve. To avoid such possible problems, and for other reasons, a data relevance module may examine awareness data managed by or known to an awareness system 120, as well as in some cases other "context information" such as the user or other entity for which relevance is being determined, and determine that particular pieces of awareness data are more relevant or interesting for one or more reasons. As just one example, awareness data that a particular document is being viewed by another user may be more interesting to the author of the document than it would be to a user that has never viewed the document. In another example, the knowledge that another user is viewing a document that is also currently being viewed by the user might be more interesting than knowledge that an unrelated document is being viewed. In yet another example, knowledge that a user on a "friends" list just became available may be more relevant or interesting than knowledge that some other user has become available. A wide variety of mechanisms for determining the relevance of awareness data are described elsewhere herein. In some implementations of the operational flow 200, described below with reference to FIG. 2, an exemplary data relevance module may implement at least part of, for example, the operation 215, and one or more of the techniques described with reference to operation 215 may be used when determining the relevance of awareness data.

In some implementations, a data relevance module may determine varying levels of relevance, in addition to just determining if a particular action or event is relevant or not relevant. As just one of many possible examples, a particular action or change might be determined to be "very relevant," another action or change might be determined to be "somewhat relevant," and yet another action or change might be determined to be "not relevant." Such varying levels of relevance may then be used in a variety of ways, including as part of determining how a user might be notified of relevant actions, events, or changes through one or more user interfaces, as part of the information possibly provided using one or more APIs, and so on. For example, in at least one implementation a user might have the ability to express how at least some awareness data may be presented or how the user may be notified of relevant awareness data. For example, a user might specify that the most relevant awareness data should be displayed in a pop-up dialog or a notification pane that appears "on top of" other applications and user interfaces and that displays the most relevant awareness data that has been gathered across the system from multiple applications, processes, and so on. Somewhat relevant awareness data may be added, for example, to a master list of awareness data in the same notification pane, but the notification pane might not actually be displayed until the user specifically takes an action—such as clicking a button—to display the notification pane. Even less relevant awareness data may not be added to a master list, but may instead, for example, only be shown to a user in a particular context that may relate to the particular awareness data. For example, a "less relevant" change to a particular document might result in a user interface that includes an "unread mark" of some kind associated with that document. In some implementations, such an unread mark may only be visible to a user when the user views a user interface associated with the location in which the document is stored or accessed, may only be visible when using an application that displays documents of that type, and so on.

An exemplary embodiment of an API module 140 may include one or more APIs that provide the ability for other executable processes or applications to interact programmatically with the awareness system 120. In some implementations, for example and as introduced previously, an API module might include one or more APIs, such as functions or methods, that enable other processes or applications to provide the awareness system generally, and possibly the data gather module 125 specifically, with awareness data. In some implementations, such an API may enable another entity to provide awareness data that the data gather module might not otherwise be able to obtain.

In the same or other implementations, an API module might provide APIs that expose information maintained or generated by the awareness module. For example, an API module might provide the ability for other processes or applications to query or obtain awareness or relevance data maintained or generated by the awareness system. With such an implementation, an application might, for example, query the awareness system for awareness data that is related, say, to a particular application, a particular user or users, a particular piece of data such as a document or file, and so on. The querying application might then use the awareness data that is provided in a variety of ways, including as part of providing its own user interface that displays at least some portion of the awareness data, or in a variety of other processing that uses awareness data including updating other data stores, and so on. Some APIs provided by an exemplary API module may be generally used on a particular endpoint or computer device, while the same or other APIs may in some implementations be provided to other computing devices including computing devices connected to the API module by one or more networks. For example, another computing device might access an API module using one or more "web service" interfaces or other network programming techniques or systems.

An exemplary awareness user interface module 145 may implement, at least in part, executable code to generate or display one or more user interfaces related to awareness information. For example, a user interface provided by an awareness system might include a notification pane or other user interface that displays actions or events that have been determined—perhaps through the use of a data relevance module—to be relevant or interesting to a user. One exemplary implementation of a user interface that might be associated with an awareness user interface module might be a notification pane user interface, such as the notification pane discussed in more detail below with reference to FIG. 3. In the same or another exemplary implementation, a "companion pane" or other similar user interface may be provided by a user interface module and linked or associated in some manner with an existing application. For example, an exemplary companion pane—including possibly the companion pane user interface described below with reference to FIG. 4—might be implemented as a window that may be displayed next to or near another application and, in such a case or in other cases, may display awareness data that has been determined to be relevant and that is related to or associated in some way with the application.

It should be noted that an exemplary user interface module 145 may not be the only provider or implementer of user interfaces that include awareness data or information derived or generated using awareness data, and that other applications, processes, and so on may also provide user interfaces that incorporate or display such data. For example, in some implementations one or more user interfaces or other functionality provided by an exemplary operating system shell 160 may include or display awareness information. In the same or other implementations, applications may access and include awareness data in their own user interfaces. In either of these examples, the awareness data may be obtained or retrieved in one or more of a variety of ways, including possibly through the use of an API module 140 or perhaps by directly retrieving awareness data from a data storage module 130.

An exemplary operating system shell 160 may include a variety of functionality associated with and provided by an operating system in use on the device endpoint A 110, including in some implementations functionality that uses the awareness system 120. In some implementations, such functionality might include enhancements to existing user interfaces provided by the operating system shell as well as possibly entirely new user interfaces. Such functionality may also include access to awareness data or information made available through other mechanisms that do not include a user interface, including through programmatic interfaces such as APIs provided by the operating system shell. Some exemplary implementations of possible user interfaces that use awareness data and might be provided by an operating system shell are described below in more detail with reference to, for example and without limitation, FIG. 5, FIG. 6, and FIG. 7. It should also be noted that that the operating system shell should not be interpreted to only include functionality that might typically be associated with, for example, a command-line shell environment such as the "BASH shell" or the "C shell," and may include a variety of graphical and other functionality.

An exemplary device endpoint, like the device endpoint A 110, may include a variety of applications that use the awareness system 120, including the exemplary application A 170 and the exemplary application B 172. Such applications might obtain or access awareness data in a variety of ways, including possibly through the use of an exemplary API module 140 or by accessing a data storage module 130, and might similarly display or use the retrieved awareness data in a variety of ways, including as part of a user interface provided by the application or in application processing (including processing that is not associated with a user interface).

The exemplary device endpoint A 110 is shown as connected to the device endpoint B 180 and the device endpoint X 190. Generally, awareness functionality like that provided by an awareness system 120 may be implemented on a variety of types of computing devices, including device endpoints, server endpoints, and general computing devices including those described in more detail below with reference to FIG. 9. Endpoints may similarly communicate with each other through a variety of communication means, including communication means described below with reference to FIG. 9 such as wired networks, wireless networks, the physical exchange of data (such as might be implemented using portable storage like a "USB thumbdrive," or the like), and so on. Furthermore, in at least some implementations a device endpoint might be of a type that might not typically be considered to be a computing device, including devices that include only minimal computing or communication functionality. For example, in one implementation one or more of a variety of household appliances, such as washing machines, refrigerators, ovens, and so on, might each be a device endpoint and have at least some capabilities associated with or related to awareness data, including perhaps the ability to generate awareness data and communicate awareness data to another endpoint.

In at least some environments, one or more endpoints that may include an awareness system may be owned, operated, or in some way associated with the same user. For example, the device endpoint A 110 and the device endpoint B 180 are both shown in FIG. 1 as being associated with an exemplary "user 1." A variety of information, including awareness data (as well as also other information, like perhaps files or documents), may be synchronized, replicated, or at least accessible on multiple endpoints associated with the same user. In addition, the same information, or some subset or superset of the information, may be communicated with or accessible to or from one or more endpoints associated with a second user, including the exemplary device endpoint X 190 that is shown in FIG. 1 as being associated with "user 2." In at least some implementations, although not shown, the device endpoint B and the device endpoint X might also include an awareness system.

Some or all of the device endpoints might also communicate with one or more server endpoints, including the exemplary server endpoint 195. Such a server endpoint might provide a variety of functionality to one or more of the device endpoints. For example, a server endpoint might provide a data storage location that might be used by a device endpoint as an alternative location for data created or maintained by a particular user or device endpoint, or for other data including data shared by a variety of users, applications, or devices. In some implementations, a server might provide an awareness system itself and might, for example, store awareness data, determine the relevance of awareness data, and communicate or provide the awareness data and other related information to one or more device endpoints.

Figure 2:
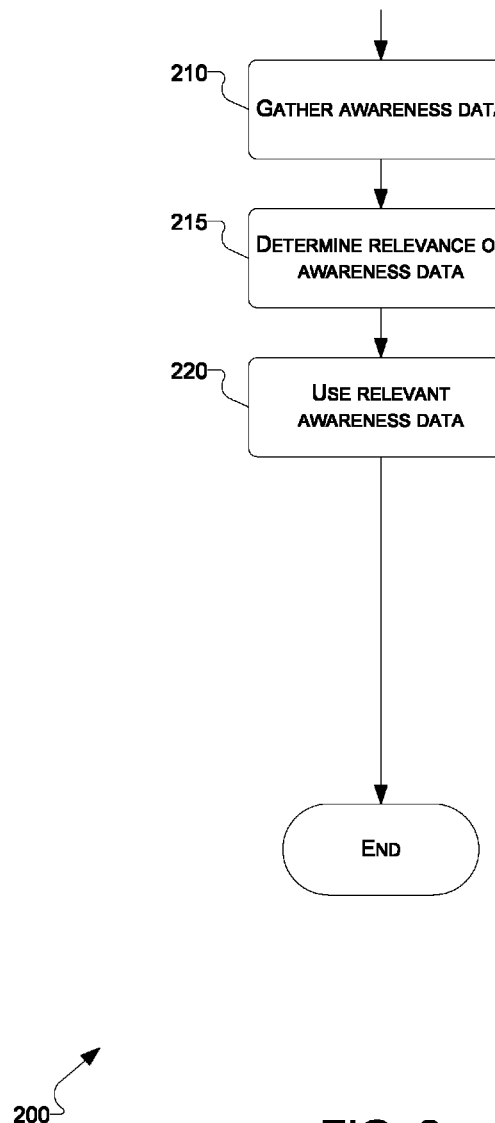
FIG. 2 illustrates an exemplary generalized operational flow including various operations that may be performed when gathering and using awareness data.

Turning now to FIG. 2, shown therein is an exemplary generalized operational flow 200 including various operations that may be performed when gathering and using awareness data. The following description of FIG. 2 may be made with reference to other figures. However, it should be understood that the operational flow described with reference to FIG. 2 is not intended to be limited to being used with the elements described with reference to these other figures. In addition, while the exemplary operational flow of FIG. 2 indicates a particular order of execution, in one or more alternative embodiments the operations may be ordered differently. Furthermore, while the exemplary operational flow contains multiple steps, it should be recognized that in some implementations at least some of these operations may be combined or executed contemporaneously, and in the same or other implementations, some steps may not be executed.

In an exemplary implementation of operation 210, awareness data may be gathered from one or more of a variety of sources. For example, on a computing device that runs an operating system and hosts multiple processes and applications, awareness data might be gathered from multiple applications as well as possibly from the operating system itself. In at least some implementations, operation 210 may be implemented, at least in part, by an exemplary data gather module 125 like that introduced previously with reference to FIG. 1. Awareness data may be gathered in a variety of ways, including by observation of applications or the operating system, by receiving awareness data provided pro-actively by applications or the operating system, and by the use of common data. Awareness data may also be received in some implementations from a variety of other systems or computing endpoints. For example, information about at least some actions or events that take place on, say, another device endpoint may be communicated and gathered by at least some implementations of operation 210.

In an exemplary implementation of operation 215, the relevance of awareness data may be determined. While the relevance of a particular piece of awareness data—such as a particular action, event, or change—may be determined in a variety of ways, in at least some implementations relevance may be determined generally, at least in part, through the use of the awareness data and other context information. As used herein, such context information may generally be defined to be information or data about the entity for which relevance is being determined. For example, when determining whether an action or event is relevant to a particular user, context data might include information that is associated with or related to the particular user. Such context information might include, for example, activities the user is currently or has previously performed; documents, files, or data that the user is currently or has previously viewed, modified, or otherwise accessed; other users with which the user is currently communicating, with whom the user has previously communicated, or that are associated with data or other actions the user has taken or is taking; whether the user has previously demonstrated or is currently demonstrating an interest in an action, event, or data; and so on. In some implementations, at least some of such context information might be used to predict actions the user might take in the future, data the user might access in the future, and so on, and such predicted actions, data, and the like, might also be included in the context information used when determining relevance.

For example, in some implementations the current activity being performed by a user may be used as part of determining the relevance of awareness data. If, say, the user is currently viewing or modifying a particular document, then some other modification of the same document by another user may be determined to be more relevant than, say, the modification of some other unrelated document. If a user is currently communicating with a particular other user—perhaps through the use of instant messages or a telephone call, for example—an action performed by the other user may be determined to be more relevant than an action performed by some other user. If a user is currently viewing a particular location, such as a directory or folder, or using a particular application, then activities or events associated with that location or application may be determined to be more relevant than activities or events associated with another location or application.

In the same or other exemplary implementations, information about another user that has performed some activity or that is associated with some event may be used as part of determining the relevance of awareness data to a particular user. For example, an activity performed by some user in the user's list of friends (or any other set of associated people, contacts, users, and so on) may be determined to be more relevant than an activity performed by some other user that is not in some set of people that has special meaning to a user. In another example, an activity or event associated with some user that has a relationship with the user may be determined to be more relevant. For example, an activity performed by a user's supervisor, spouse, child, or the like, may be determined to be more relevant than an activity performed by someone with no (or at least a less important) relationship to the user.

In the same or other exemplary implementations, the relevance of a particular piece of awareness data may be determined, at least in part, using a particular document, file, or other data that may be part of the awareness data. For example, actions—such as edits or other changes—related to a document that was created by the user may generally be considered to be more relevant than actions associated with a document that has no relationship to the user. Similarly, when a document authored or changed by a user is commented on, responded to, viewed, or otherwise accessed in some manner, such an action may be determined to be more relevant. Generally, actions associated with a piece of data that is related to a user may be determined to be more relevant than actions associated with a piece of data that is not related to or associated with a user.

In the same or yet other exemplary implementations, whether the user has previously expressed some interest in a particular piece of data, device, other user, type of activity, and so on, may be used as part of determining whether particular awareness data is relevant. For example, when a user has reacted or responded to previous notifications about a particular type of awareness data—such as a previous change to a particular document, a previous notification about a particular other user being available online, and so on—then new activities or events associated with the same document, user, and so on, may be determined to be more relevant to the user than activities or events associated with some other entity about which notifications have been ignored. Similarly, if a user has previously ignored awareness data, notifications, or the like, associated with a particular entity, then new activities, events, or changes associated with the previously ignored entity may be determined to be less relevant. In another example, if a user has previously ignored or paid less attention to new data in a particular location—say, so there are now a number of unread documents in a particular folder, perhaps—then another new or changed piece of data in the same location may be determined to be less relevant than a new piece of data associated with a location to which the user has previously paid more attention.

Whether a piece of awareness data is relevant may also be determined for entities other than users. For example, in at least some implementations of operation 215, the relevance of awareness data may be determined for a particular device, for a particular application, or for some other entity. In some implementations, for example, when determining if a piece of awareness data is relevant for a particular device, similar types of context information and other determinations may be used. For example, it may be more likely that a document or file that has previously been synchronized to a particular device will be determined to be relevant to that device than a document that has not been synchronized to the device.

In at least some cases, operation 215 may be implemented, at least in part, by an exemplary data relevance module, such as the data relevance module 135 described previously with reference to FIG. 1.

Finally, in an exemplary implementation of operation 220, awareness data, including awareness data that was determined to be relevant perhaps by an implementation of operation 215, may be used in one or more of a variety of fashions. In some implementations, relevant awareness data may be used as part of one or more user interfaces including user interfaces provided by an awareness system, by an operating system shell, or by one or more applications that use awareness data. At least some exemplary user interfaces that use awareness data are described in more detail below with reference to FIG. 3, FIG. 4, FIG. 5, FIG. 6, FIG. 7, and FIG. 8. In the same or other implementations, relevant awareness data may be provided or made available to the awareness system or to other processes or applications, and may be used in a variety of other ways including as part of processing that may not be associated with a visible user interface. For example, such data may be made available using one or more APIs provided by the awareness system.

At least some of the subsequent figures show a variety of user interfaces that might be used with awareness data. Generally, the description of a particular figure may be made in some cases with reference to other figures. However, it should be understood that the elements described with reference to any particular figure are not intended to be limited to being used with the elements described with reference to that figure or to other figures. In addition, while the exemplary diagram or diagrams in a particular figure may indicate particular elements, in some implementations not all of these elements may exist, and in some implementations additional elements may exist. Furthermore, it should be understood that the exemplary graphical representations of the user interfaces are provided only for purposes of discussion and explanation, and in no way should be construed as limiting the scope of the user interfaces or techniques described herein to any particular graphical or other representation. Furthermore, the user interfaces may be implemented in a variety of ways, using a variety of technologies, with a variety of differences from the exemplary user interfaces, and so on, without departing from the elements of the user interfaces as described herein.

Figure 3:
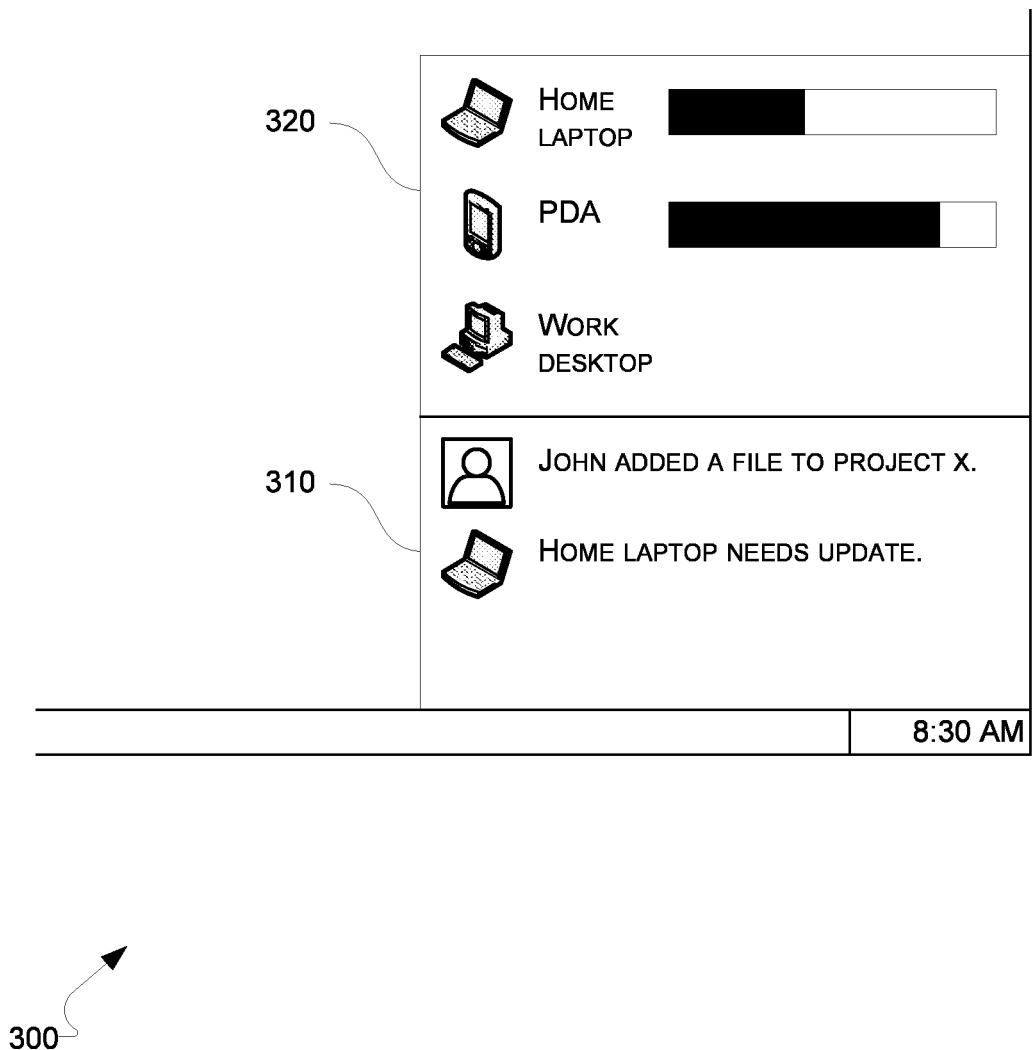
FIG. 3 illustrates one example of a notification pane user interface that may be displayed as part of notifying a user at various times, including when one or more pieces of awareness data have been determined to be relevant.

Turning now to FIG. 3, shown therein is one example of a notification pane user interface 300 that may be displayed as part of notifying a user at various times, including when one or more pieces of awareness data have been determined to be relevant. In some implementations, such a notification pane may include a relevant awareness data portion 310 that includes one or more awareness data notifications, including notifications for awareness data that has been determined to be relevant. For example, as shown in FIG. 3, the action represented by the text "John added a file to project X' may have been determined to be relevant to the user viewing the notification pane for one or more of a variety of reasons, including those described elsewhere herein. In just one example, perhaps, the user viewing this notification may have "John" on a list of friends or contacts, might be working on a project with "John," might have previously added or viewed a document associated with "Project X," and so on. Similarly, the notification represented by the text "Home laptop needs update" may have been determined to be relevant for one or more reasons. For example, the user viewing this notification may have previously set up or used the "Home laptop," or the "update" may have been determined to be important because it, say, fixes a security flaw or for some other reason, and so on.

In some implementations, only particular pieces of awareness data may be displayed in a notification pane. For example, when a highly relevant piece of awareness data is found, the piece of awareness data might be added to the notification pane user interface 300 and the notification pane itself may be "brought to the top" of other windows or generally displayed conspicuously in one or more of a variety of ways. A somewhat less relevant or less important piece of awareness data might be added to the notification pane, but the notification pane itself may not be shown immediately. Instead, perhaps, a user might only see the new addition when they take a particular action to view the notification pane user interface. Other pieces of awareness data, including in some implementations awareness data that is determined to be even less relevant, may not be added to a user interface like the notification pane user interface and might instead be made available to a user through one or more of a variety of user interfaces or other actions, including those described elsewhere herein.

In some implementations, a notification pane user interface 300 may also display a variety of other information or data. For example, as shown, the notification pane user interface also includes a synchronization status data portion 320 that in this exemplary instance of the notification pane shows three other device endpoints that might be associated, for example, with the user viewing the notification pane. In some implementations, a synchronization status data portion might include information such as the status of data synchronization with other computing devices associated with the user. In the same or other implementations a notification pane user interface might not include a synchronization status data portion, or might include additional user interface portions or elements associated with the display of the same or other types of data.

Figure 4:
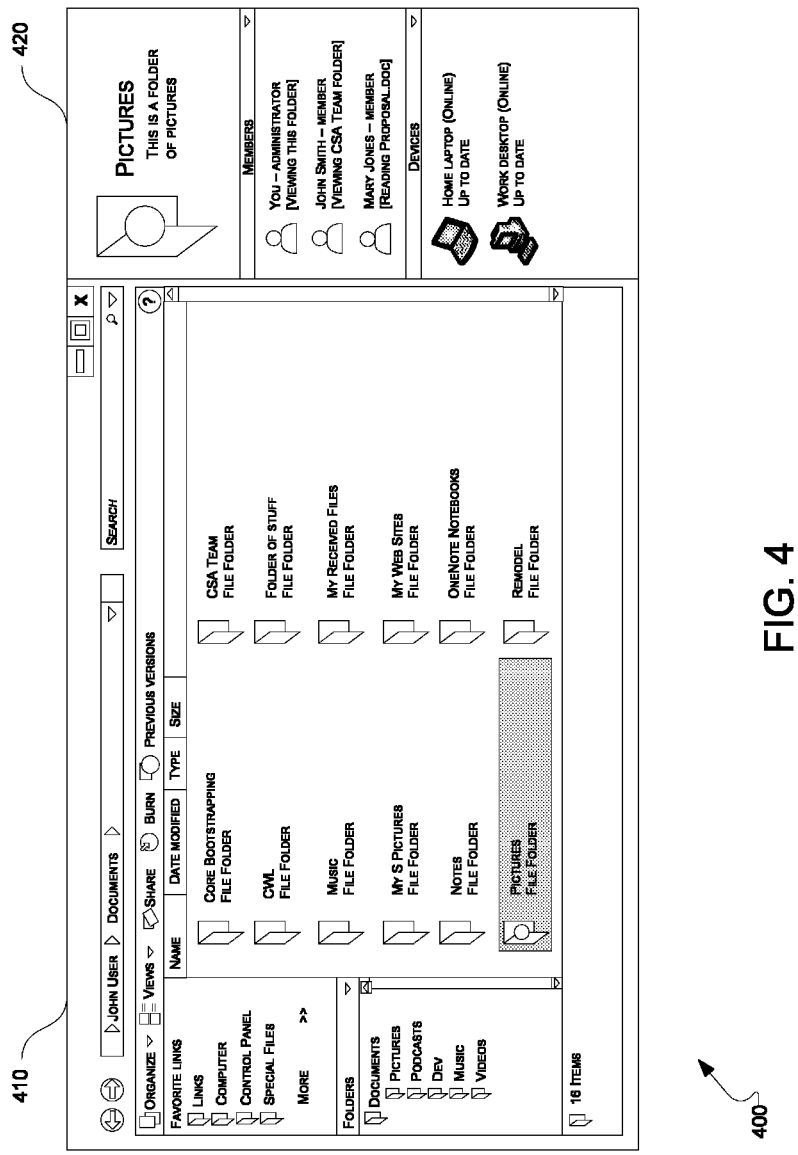
FIG. 4 illustrates an exemplary user interface that includes the display of awareness data in a user interface that is a companion to an application.

Turning now to FIG. 4, shown therein is an exemplary user interface 400 that includes the display of awareness data in a user interface that is a companion to an application. The user interface 400 includes an application user interface 410 and a companion pane 420. In this example, the application user interface might be used to display folders and files in particular locations, but might in a variety of other implementations display a variety of other data including specific documents, database records, graphical images or diagrams, and so on. In at least some implementations, any type of application might be encompassed by the exemplary application user interface.

In some implementations, an awareness system, or some other system, might provide a companion pane, such as the exemplary companion pane 420. Such a companion pane may be associated with the application user interface 410 in one or more fashions. In some implementations such an association may be made only visually—that is, the companion pane may be displayed next to or in some proximity to the application user interface even while it is not "part of" the application user interface, or even while it might be provided by some other executable code that is not part of the application or process that provides the application user interface. In other implementations, the companion pane might be displayed by the same application that displays the application user interface.

Generally, a companion pane 420 may include a variety of information including in some cases awareness data associated generally with the application, awareness data associated with data displayed in the application user interface, and so on. For example, as shown in the specific exemplary user interface 400 the companion pane includes awareness data about users that are currently viewing or have open particular locations represented in or related to the information displayed by the application user interface 410. Such users in this case include the current user viewing this user interface ("You—Administrator"), as well as "John Smith—Member" and "Mary Jones—Member." Using this part of the companion pane, the user ("You") might be able to determine, for example, that another user—like "John" or "Mary"—is online and is viewing particular information, such as a certain folder or document. The exemplary companion pane 420 might indicate to the user viewing the companion pane that "John" is viewing or has open the "CSA Team" folder and also indicate that "Mary" has opened or is reading the "Proposal.doc" file.

In this example, the companion pane 420 also demonstrates one manner in which awareness data about the devices that are online and associated with the current user might be displayed. Such devices might, for example, have synchronized or stored at least some of the data shown in the associated application user interface 410.

While users and devices are shown in this particular example, in the same or other implementations, any of a variety of the same or other awareness data might be displayed in a companion pane.

Figure 5:
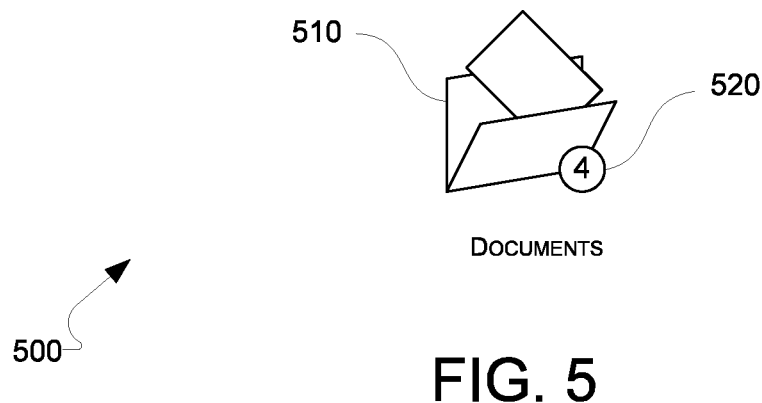
FIG. 5 illustrates an exemplary user interface that might be displayed by an operating system shell as part of communicating awareness data.

Turning now to FIG. 5, shown therein is an exemplary user interface 500 that might be displayed by an operating system shell (or by an application) as part of communicating awareness data. Generally, the existing user interfaces provided by an operating system shell might be modified or enhanced in a variety of ways to show awareness data. In this specific example, the user interface includes an icon 510 that also includes an awareness data display portion 520 that in this example might display awareness data that perhaps includes the number of users that are currently viewing or otherwise accessing the location or workspace associated with the icon. In this example, the icon might indicate that four users are currently viewing or working with the "Documents" folder.

In the same or other implementations, the exemplary icon 510 might use a variety of other user interface characteristics to provide or communicate awareness data. For example, other parts of an icon's graphical representation might change to communicate awareness data. For example, to indicate that some other user is accessing the location associated with an icon, the icon's appearance might be changed to appear with a "gleam," for example, by perhaps appearing brighter. In the same or another implementation, an icon might have assistive text that appears when the icon is selected or a mouse or other input device is used to indicate or "hover" over the icon. Such assistive text might change to indicate or communicate a variety of awareness data. Furthermore, an exemplary user interface, including an icon, might have its appearance changed in a variety of other ways, and might communicate a variety of awareness data in addition to or instead of just the number of users associated with a particular location.

The icon 510 itself might be displayed in a variety of locations within one or more user interfaces provided by the operating system shell, such as in an application that enables the viewing of files and folders, on a "desktop," in a "Start menu," and so on. A variety of other parts of a user interface provided by an operating system shell might also be modified to show awareness data in a variety of ways. Such other user interfaces provided by an operating system shell might include, for example, a list of currently running applications, a collection of icons displayed for one or more purposes, "common dialogs," the "title" bar of operating system shell windows, and so on. In addition, an icon like the exemplary icon 510 might also be displayed in one or more of a variety of applications.

Figure 6:
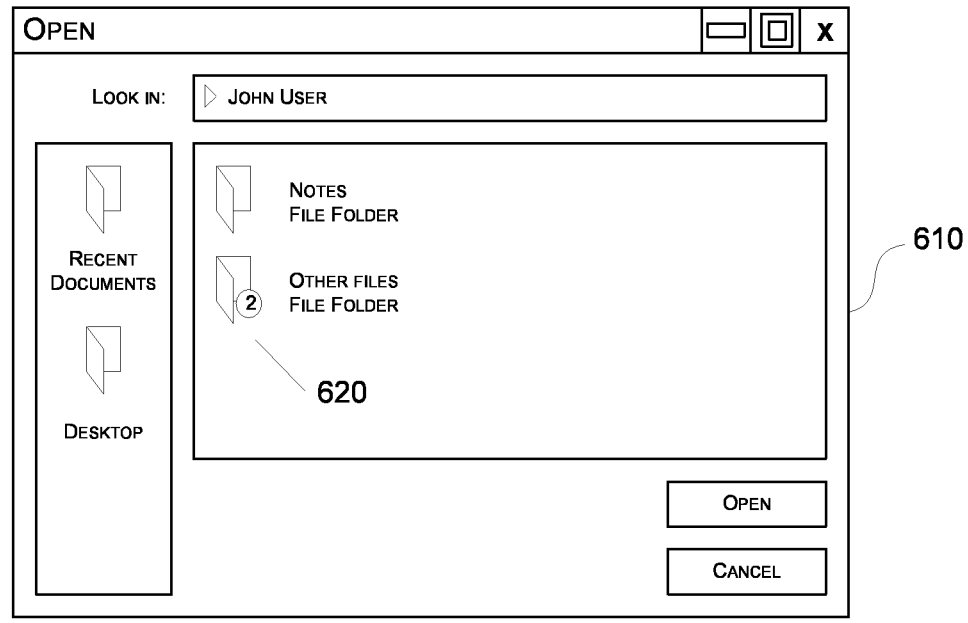
FIG. 6 illustrates an exemplary user interface that includes a common dialog that displays awareness data.

Turning now to FIG. 6, shown therein is an exemplary user interface 600 that includes a common dialog 610 that displays awareness data. The common dialog might be a user interface that is in at least some implementations provided by the operating system shell and that a variety of applications and processes may use as part of implementing particular functionality. For example, a variety of applications that implement functionality to "open" a document for viewing or editing might use an "open" common dialog provided by the operating system shell. (Using such a dialog might provide advantages such as reducing the amount of development effort required by the application developer and aiding in ensuring a consistent user interface across different applications, because the application developer is not required to implement an "open" dialog for each application and can instead use the "stock" open dialog provided by the operating system shell.)

Such a common dialog may be updated to display or communicate awareness data in a variety of ways. For example, the exemplary common dialog 610 displays folders using, in part, icons, and the exemplary icon 620 might communicate the number of users currently accessing the location associated with the icon. In the same or other implementations, an icon or an entire common dialog might communicate awareness data using a variety of other user interface changes.

An operating system shell might also provide a number of other common or stock dialogs for a variety of purposes (such as "save," and so on), and any of such other common dialogs may also be updated to show awareness data in the same or different ways.

Figure 7:
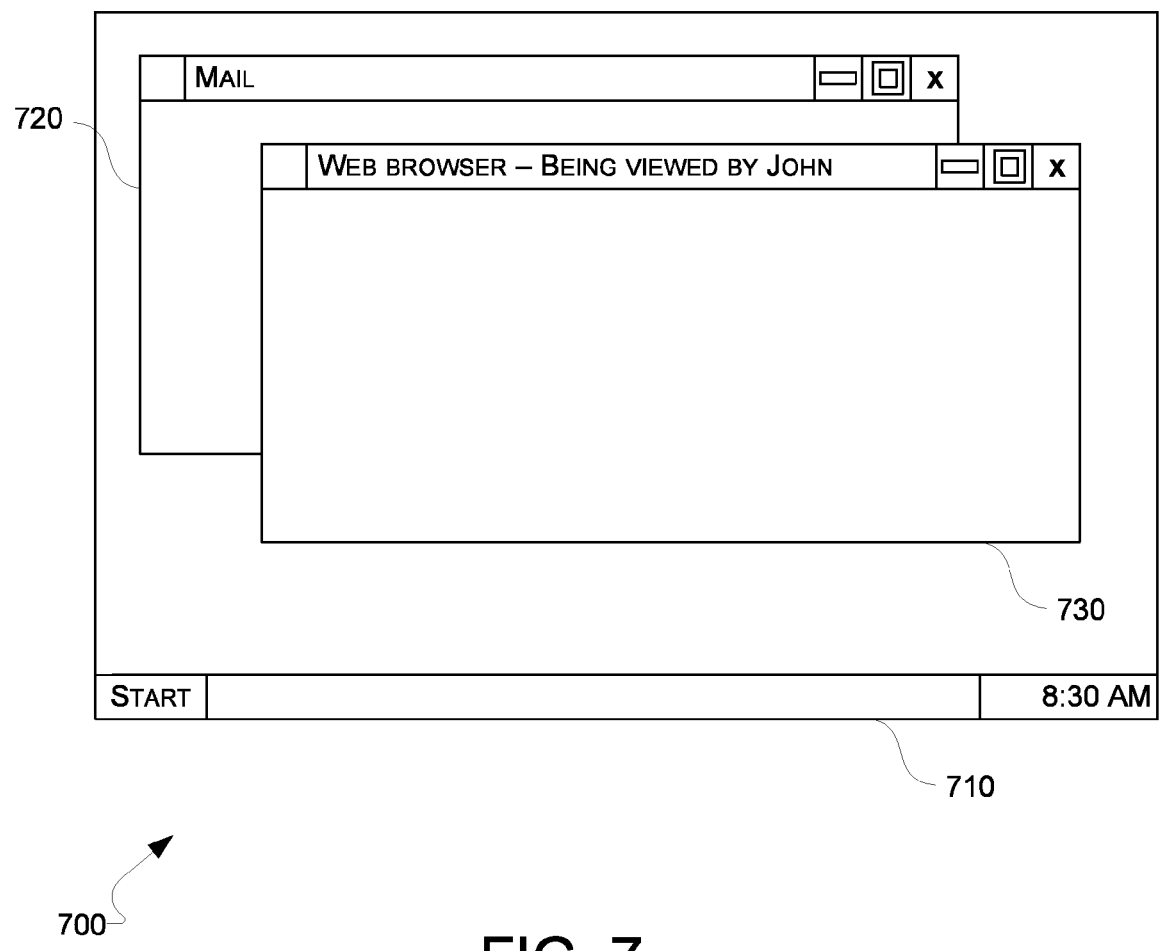
FIG. 7 illustrates an exemplary user interface that displays awareness data as part of a window user interface.

Turning now to FIG. 7, shown therein is an exemplary user interface 700 that displays awareness data as part of a window user interface. In this example, at least some awareness data is displayed using a window's title bar. For example, a user—perhaps called "Mary"—might have a first application 720 and a second application 730 displayed in an exemplary and simplified representation of an operating system shell 710. At the same time, another user named "John" that is perhaps located elsewhere and that is connected to this endpoint through a network might be viewing or controlling one or more particular applications or windows maintained by "Mary," perhaps using one or more "remote desktop" or other communication mechanisms. To indicate that the second application 730 is being viewed and possibly controlled by "John," the operating system shell or the application itself might obtain awareness data, in this case awareness data that includes that the particular application is being shared and the user that is sharing the application, and display some representation of the awareness data. In this example, the "title bar" of the application might be updated by the operating system shell or the application to include text such as the exemplary "Being viewed by John" text shown in FIG. 7. In other implementations such awareness data may be communicated through a variety of other user interface changes, and other awareness data may be communicated in the same or other ways.

Figure 8:
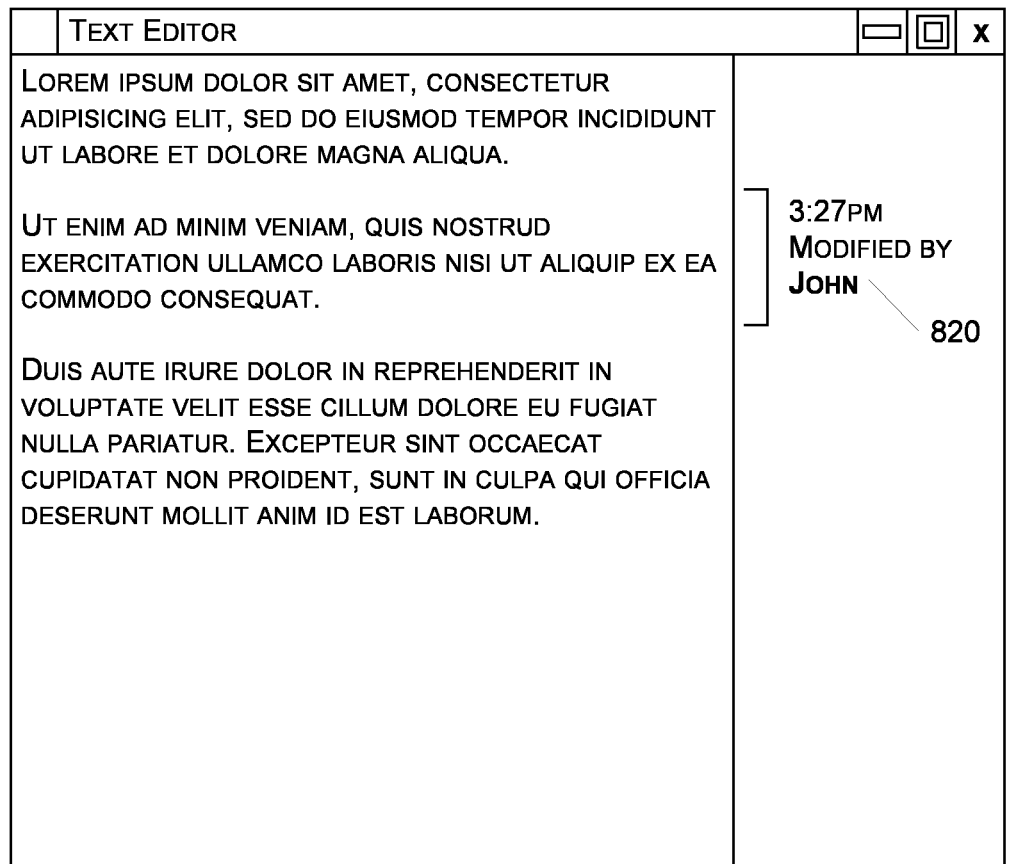
FIG. 8 illustrates one example of how an application user interface might display awareness data.

Turning now to FIG. 8, shown therein is one example of how an application user interface 800 might display awareness data. In this example, one user—again perhaps called "Mary"—might be using a word processing or text editor application 810 to view and modify text in a particular document. At the same time, another use—one named "John" in this example—might be viewing and editing the same document perhaps on another computing device that is connected to the "Mary's" computing device in some fashion. In at least some implementations, when "John" modifies the document—perhaps by changing the text in the second paragraph—an awareness data portion 820 of the text editor user interface might be updated so that "Mary" may be made aware of the action taken by "John."

In some implementations, such awareness data—including perhaps the paragraph that "John" is editing—might be provided by "John's" instance of the text editor application 810 to an awareness system perhaps using one or more APIs provided by the awareness system. The awareness data might then be communicated to an awareness system associated with "Mary" and determined to be relevant—perhaps because "Mary" is currently viewing the same document. When the text editor application includes functionality to access and display particular awareness data provided by an awareness system, such awareness data might then be used to update the user interface associated with the text editor application, one example of which is shown by the exemplary awareness data portion 820.

Example Computing Environment

Figure 9:
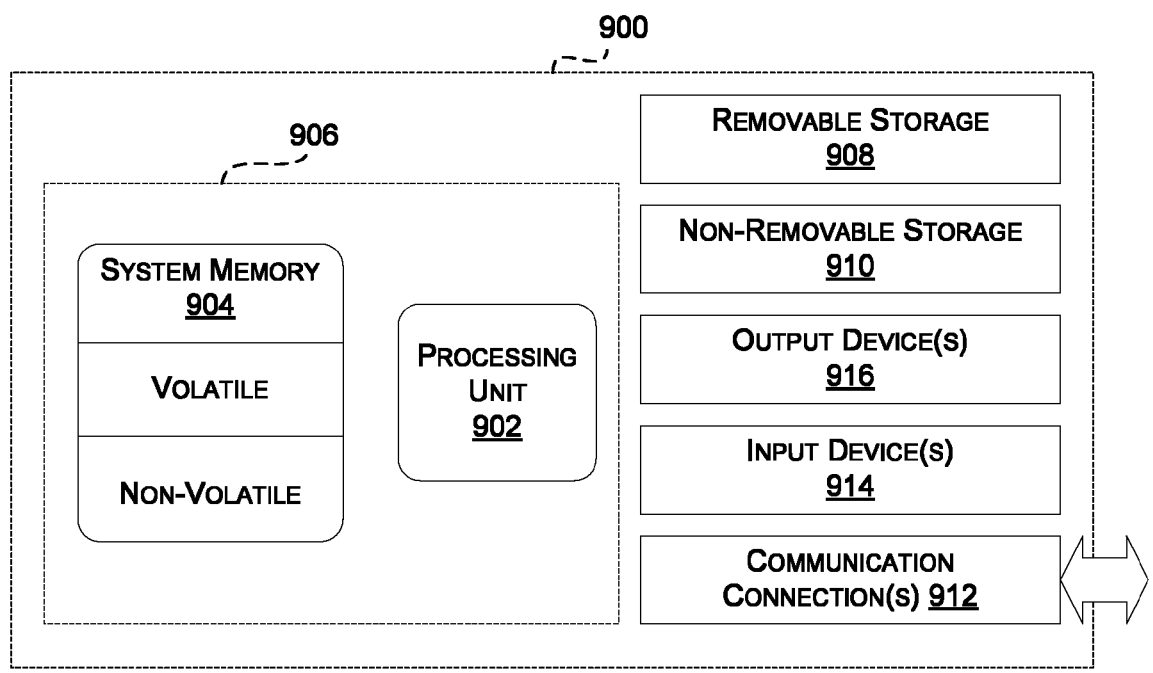
FIG. 9 illustrates an exemplary computing environment in which the various technologies described herein may be implemented.

Turning now to FIG. 9, this figure and the related description are intended to provide a brief and general description of an exemplary computing environment in which the various technologies described herein may be implemented. Although not required, the technologies are described herein, at least in part, in the general context of computer-executable instructions, such as program modules that are executed by a controller, processor, personal computer, or other computing device, such as the computing device 900 illustrated in FIG. 9.

Generally, program modules include routines, programs, objects, components, user interfaces, data structures, and so on, that perform particular tasks, display particular information, or implement particular abstract data types. Operations performed by the program modules have been described previously with the aid of one or more block diagrams and operational flowcharts.

Those skilled in the art can implement the description, block diagrams, and operational flows in the form of computer-executable instructions, which may be embodied in one or more forms of computer-readable media. As used herein, computer-readable media may be any media that can store or embody information that is encoded in a form that can be accessed and understood by a computer. Typical forms of computer-readable media include, without limitation, both volatile and nonvolatile memory, data storage devices, including removable and/or non-removable media, and communications media.

Communication media embodies computer-readable information in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communications media includes wired media such as a wired network or direct-wired connection, and wireless media such as acoustic, RF, infrared and other wireless media.

The computing device 900 illustrated in FIG. 9, in its most basic configuration, includes at least one processing unit 902 and memory 904. In some implementations, the computing device 900 may implement at least part of, for example, one of the device or server endpoints described previously with reference to FIG. 1, such as the device endpoint A 110 or the server endpoint 195. In some implementations, the processing unit 902 may be a general purpose central processing unit (CPU), as exists, for example, on a variety of computers, including desktop and laptop computers. Depending on the exact configuration and type of computing device, the memory 904 may be volatile (such as RAM), non-volatile (such as ROM, flash memory, and so on), or some combination of the two. This most basic configuration is illustrated in FIG. 9 by dashed line 906. Additionally, the computing device 900 may also have additional features and functionality. For example, the computing device 900 may also include additional storage (removable and/or non-removable) including, but not limited to, magnetic or optical disks or tape. Such additional storage is illustrated in FIG. 9 by the removable storage 908 and the non-removable storage 910.

The computing device 900 may also contain one or more communications connection(s) 912 that allow the computing device 900 to communicate with other devices and endpoints. For example, the computing device might have one or more connections to a variety of communication means or computing devices, including, for example, connections to or between endpoints described previously with reference to FIG. 1. The computing device 900 may also have one or more input device(s) 914 such as image input devices like cameras or scanners, keyboards, mice, pens, voice input devices including microphone arrays, touch input devices, and so on. One or more output device(s) 916 such as a display, speakers, printer, and so on, may also be included in the computing device 900.

Those skilled in the art will appreciate that the technologies described herein may be practiced with computing devices other than the computing device 900 illustrated in FIG. 9. For example, and without limitation, the technologies described herein may likewise be practiced in hand-held devices including mobile telephones and PDAs, multiprocessor systems, microprocessor-based or programmable consumer electronics, network PCs, minicomputers, mainframe computers, and the like. Each of these computing devices may be described, in at some level of detail, by the system of FIG. 9, or may be described differently.

The technologies described herein may also be implemented in distributed computing environments where operations are performed by remote processing devices that are linked through a communications network. In a distributed computing environment, program modules may be located in both local and remote devices.

While described herein as being implemented in software, it will further be appreciated that the technologies described herein may alternatively be implemented all or in part as hardware, firmware, or various combinations of software, hardware, and/or firmware.

Although some particular implementations of methods and systems have been illustrated in the accompanying drawings and described in the foregoing text, it will be understood that the methods and systems shown and described are not limited to the particular implementations described, but are capable of numerous rearrangements, modifications, and substitutions without departing from the spirit set forth and defined by the following claims.

What is claimed is:

1. A system, comprising:
a computing device comprising:
an awareness data gather module configured to:
gather awareness data associated with a user, an application, and a device, the awareness data associated with the user comprising information about a status or availability of the user, the awareness data associated with the application comprising information about whether a particular application is in use, and the awareness data associated with the device comprising information as to whether the device is or is not connected to a network; and
gather second awareness data associated with a second user, a second application, and a second device wherein the second application is not the same as the application;
an awareness data relevance module configured to:
determine a level of relevance of the awareness data and the second awareness data using context information of a third user and at least three levels of relevance, the context information of the third user comprising at least one of a predicted action of the third user or data the third user is predicted to access; and
an awareness data use module configured to:
use the determined level of relevance of the awareness data and the second awareness data to provide information including at least a portion of the awareness data to the third user determined to be higher than a threshold of relevance, wherein how the third user is notified of the information is based on the determined level of relevance of the at least three levels of relevance of the awareness data, wherein each level of relevance has a different corresponding notification mechanism.

2. The system of claim 1 wherein the computing device runs executable code associated with the system, and the system can provide awareness functionality to any application running on the computing device that has a capability of accessing an API provided by an application programming interface module associated with the system.

3. The system of claim 1 wherein the awareness data use module further comprises:
a user interface module configured to:
provide a user interface to the third user wherein the user interface includes at least the portion of the awareness data and is displayed depending on the relevance of the awareness data.

4. The system of claim 1 wherein the awareness data use module further comprises:
an application programming interface module configured to:
provide an API to a third application associated with the third user and wherein the third application may access the awareness data using the API.

5. The system of claim 1 wherein the awareness data further comprises:
action information associated with an action taken by the user on the device; and
device information associated with the device.

6. The system of claim 3 wherein the user interface is associated with an operating system shell.

7. The system of claim 3 wherein the user interface comprises an icon that includes a user interface representation of the portion of the awareness data.

8. The system of claim 3 wherein the user interface comprises a notification pane that includes aggregated awareness data comprising the portion of the awareness data and at least a second portion of the second awareness data.

9. The system of claim 1, wherein the awareness data associated with the device further comprises at least one of whether the device is available or whether the device currently has spare processing power available.

10. The system of claim 8 wherein the notification pane is not displayed to the third user when the awareness data is added to the notification pane, and wherein the third user later displays the notification pane to view the portion of the awareness data.

11. The system of claim 1, further comprising:
an application configured to:
display a user interface to the third user wherein the user interface is generated by the application using the awareness data.

12. The system of claim 1 wherein the user and third user are the same user.

13. The system of claim 1 wherein the determining the relevance further comprises using the awareness data and context data associated with the third user.

14. The system of claim 1 wherein the device and the second device are not the same device and wherein the awareness data relevance module is implemented on a third device that is not the same as the device and that is not the same as the second device.

15. A method, comprising:
obtaining change information about a change to a state of first data wherein the change is associated with a first user that uses a first device and the state of first data comprises information as to whether or not the first data is currently being at least one of viewed or edited by the first user;
obtaining context information associated with a second user and a second device used by the second user wherein the second user is not the first user, the context information associated with the second user comprising at least one of a predicted action of the second user or data the second user is predicted to access; and
using a processing device, determining whether the change is relevant or not relevant to the second user by using the context information and the change information and an awareness data relevance module that is associated with providing awareness functionality to multiple applications, and, if the change is determined to be relevant to the second user, notifying the second user of the change information, wherein how the second user is notified of the change information is based on a determined level of relevance of at least three levels of relevance, wherein each level of relevance has a different corresponding notification mechanism.

16. The method of claim 15 wherein the context information further comprises an activity being performed by the second user, and the change is determined to be relevant when the activity is related to the change.

17. The method of claim 15 wherein the change information further comprises an identification of the first user making the change, and the change is determined to be relevant when the first user is related to the second user.

18. The method of claim 15 wherein the change is determined to be relevant when the first data is related to the second user.

19. The method of claim 15 wherein the change is determined to be relevant when the second user has shown an interest in a previous change that is similar to the change.

20. A method, comprising:

using a processing device gathering awareness data associated with a user, an application, and a device, the awareness data associated with the user comprising information about a status or availability of the user, the awareness data associated with the application comprising information about whether a particular application is in use, and the awareness data associated with the device comprising information as to whether the device is or is not connected to a network; and gathering second awareness data associated with a second user, a second application, and a second device wherein the second application is not the same as the application;

determining a level of relevance of the awareness data and the second awareness data using context information of a third user and at least three levels of relevance, the context information of the third user comprising at least one of a predicted action of the third user or data the third user is predicted to access; and using the determined level of relevance of the awareness data and the second awareness data to provide information including at least a portion of the awareness data to the third user determined to be higher than a threshold of relevance, wherein how the third user is notified of the information is based on the determined level of relevance of the at least three levels of relevance of the awareness data, wherein each level of relevance has a different corresponding notification mechanism.

* * * * *